March 27, 1956  E. J. AMELANG  2,740,007
TIRE PRESSURE INDICATOR
Filed Jan. 12, 1954  2 Sheets-Sheet 1

Ernst J. Amelang
INVENTOR.

March 27, 1956  E. J. AMELANG  2,740,007
TIRE PRESSURE INDICATOR

Filed Jan. 12, 1954  2 Sheets-Sheet 2

Ernst J. Amelang
INVENTOR.

BY *Clarence A. O'Brien*
and *Harvey B. Jackson*
Attorneys

United States Patent Office 2,740,007
Patented Mar. 27, 1956

2,740,007

TIRE PRESSURE INDICATOR

Ernst J. Amelang, Houston, Tex.

Application January 12, 1954, Serial No. 403,501

1 Claim. (Cl. 200—61.24)

This invention relates to a tire pressure indicator and more specifically provides a device for indicating to the driver of a vehicle any deflation of the vehicles tires.

An object of this invention is to provide a tire pressure indicator for use as a warning device on vehicles such as automobiles, trucks, busses or the like for attracting the attention of the operator of the vehicle when any one of the several tires sustains a loss of pressure, thus contributing greatly to the safety of driving as well as to the life of the tires themselves.

A further object of this invention is to provide a tire pressure indicator which is provided with means for actuating a warning signal, which means are responsive to the usual reduction of the distance from the rim to the supporting surface when the air pressure in the tire is reduced.

Yet another important object of this invention is to provide an indicator which may warn the driver of a reduction of pressure in the vehicle tires and which may be utilized in other orientations to provide a parking signal device.

A still further object of this invention is to provide a tire pressure indicator which is simple in construction, simple to install, accurate in operation, well adapted for the purposes to which the same is intended and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a transverse vertical section taken substantially along section line 5—5 showing the structural details of the indicator utilized as a parking signal; and Figure 6 is a schematic diagram showing the installation of the tire pressure indicator and the parking signal and the electrical circuit therefor.

Figure 1:
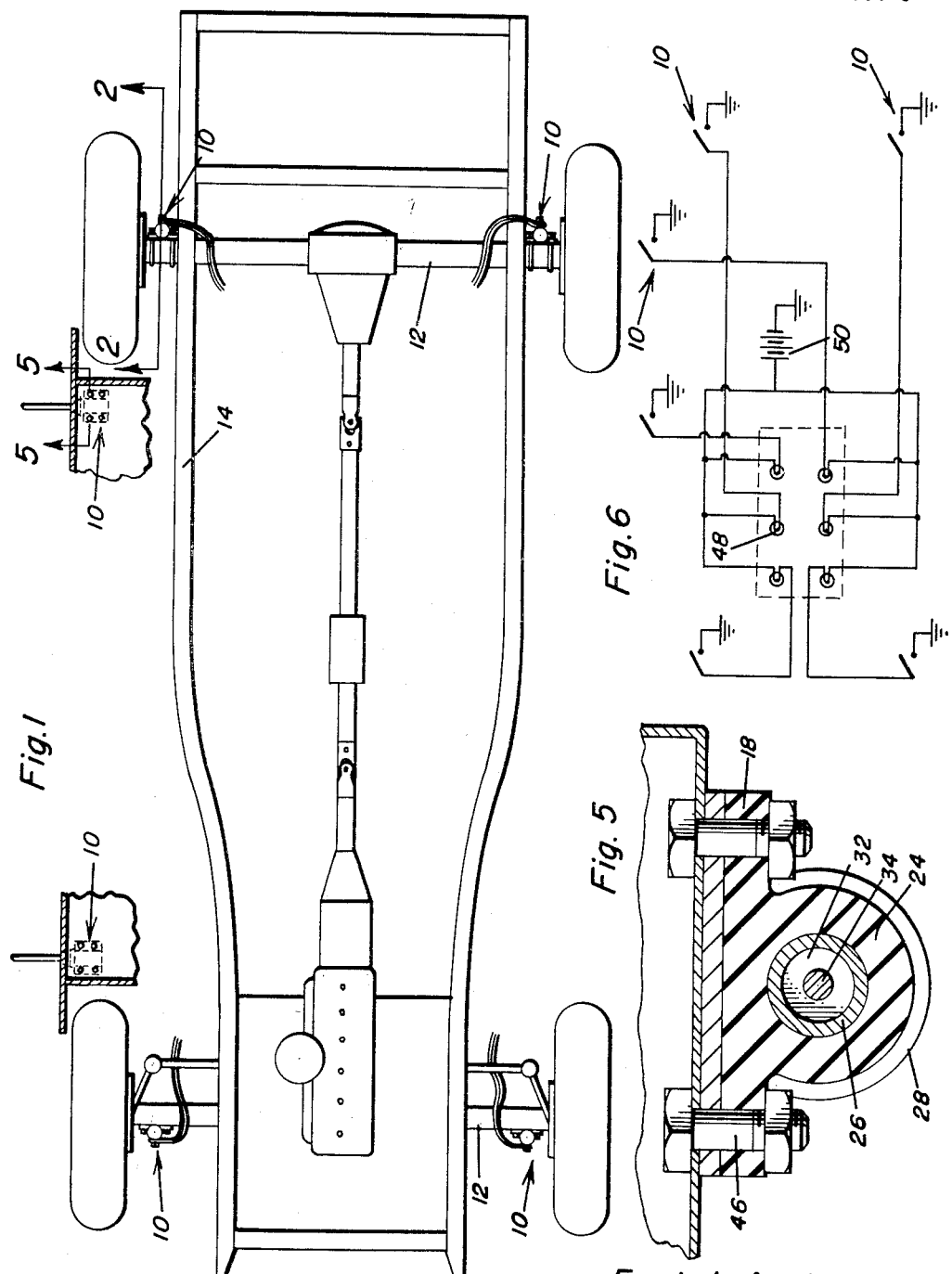
Figure 1 is a top plan view showing a vehicle frame and portions of the body with the tire pressure indicator installed thereon and utilized as a tire pressure indicator and other similar devices being installed for use as a parking indicator.

Referring now specifically to the drawing, it will be seen that the numeral 10 generally indicates the tire pressure indicator of this invention mounted upon the axles 12 of a conventional vehicle such as indicated by the numeral 14 in Figure 1 which shows the frame of a conventional vehicle. An indicator 10 is mounted at each end of the front and the rear axle and an indicator 10 is also mounted on the body of the vehicle adjacent the rear wheel and adjacent the front wheel for utilization as a parking indicator.

Figure 2:
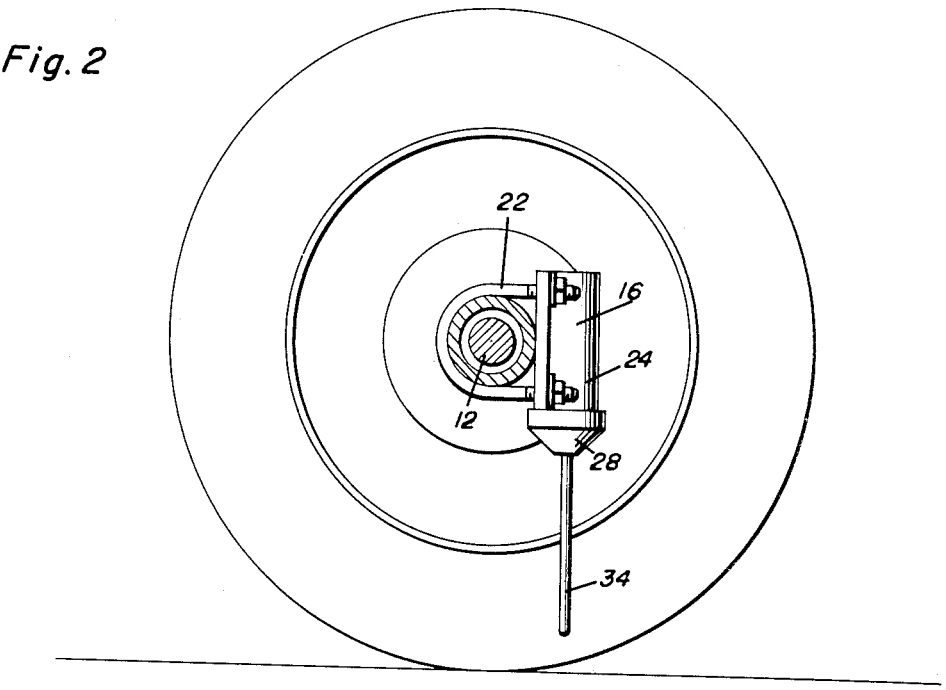
Figure 2 is a vertical section taken substantially along section line 2—2 of Figure 1 showing the installation of the tire pressure indicator of this invention.
Figure 3:
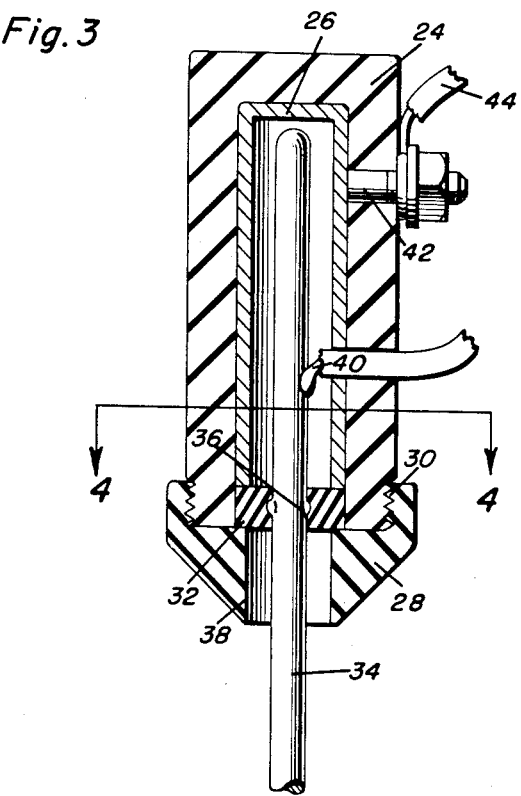
Figure 3 is a longitudinal, vertical section taken substantially along the center line of the tire pressure indicator of the construction as shown in Figure 2.
Figure 4:
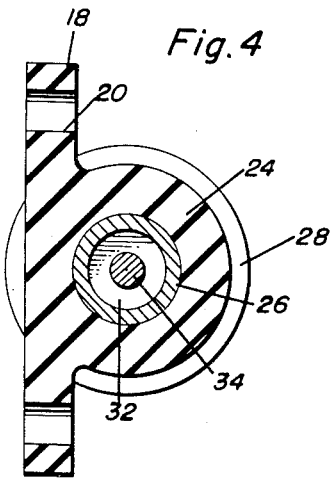
Figure 4 is a top plan section taken substantially along section line 4—4 of Figure 3 showing the structural relationships of the elements of the indicator.

Referring now specifically to Figure 2, it will be seen that the indicator 10 generally includes a tubular casing 16 having a flange 18 secured to one side and having vertically alined apertures 20 therein for receiving the free ends of U-bolts 22 for securing the indicators 10 to the axle 12 of the vehicle. The casing 16 of the indicator 10 is specifically shown in Figures 3 and 4 and includes an outer housing 24 of insulating material such as plastic and an inner housing 26 of metallic or conductive material. A cap 28 is mounted on the outer housing 24 by threads 30 and the resilient washer 32 is secured between the inner housing and the cap 28 for receiving an elongated rod 34 which projects interiorly of the interior housing 26 and projects vertically beyond the cap 28. The rod 34 has a projection 36 thereon inserted in the washer member 32 and the inner casing 26 and the cap 28 are provided with enlarged bores 38 to permit tilting movement of the elongated rod 34 upon engagement of the lower end of rod 34 with some object. The rod 34 is of metallic material and has secured thereto an electrical conductor 40 which is secured to a suitable electrical source. The upper end of the inner housing 26 is provided with a projecting stud 42 having a ground wire 44 connected thereto.

As illustrated in Figure 5, the parking indicator 10 is constructed in the same manner as the tire pressure indicator mounted on the axle 12 and the parking indicator is mounted on the body of the vehicle by suitable mounting bolts 46. The elongated rod 34 projects outwardly from the body and is adapted to engage the edge of a sidewalk or the like when parking thereby indicating to the driver how close he is to the curb.

As illustrated in Figure 6, each of the indicators 10 is connected by suitable electrical conductors to a light or other signal device indicated by the numeral 48 which receives the electrical energy from the battery 50 in an obvious manner. By observing the indicators 48, the driver of a vehicle may determine whether any of his tires are deflated or his position in relation to a curb while parking.

Obviously, the device of this invention may be employed on all types of vehicles such as automobiles, busses and the like and the device may be adjustably mounted to allow for various sizes and types of vehicle wheels and tires wherein the vehicle axles are spaced various distances above the ground. The saving of the tires and the safety factor involved will rapidly justify the cost of the tire pressure indicator of the present invention.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

An indicator actuating device comprising an outer electrically insulative cylindrical casing, an inner electrically conductive cylindrical casing entirely received within said outer casing, an elongated electrically conductive rod resiliently pivotally mounted at one end of the casing and including a portion extending into the interior of said inner casing and a portion projecting exteriorly of said casing for contacting objects, projections on said rod, a removable resilient washer within said outer casing, said rod extending through said washer with said projections being embedded in said washer, one end of said outer casing being threaded, one end of said inner casing being inwardly spaced from the threaded end of said outer casing, said washer abutting said one end of said inner casing holding said inner casing within said outer casing, and a cap threadedly secured on said outer casing holding said washer in engagement with said one end of said inner casing and retaining said inner casing within said outer casing.

References Cited in the file of this patent

UNITED STATES PATENTS

| | | |
|---|---|---|
| 1,862,242 | Schwien | June 7, 1932 |
| 2,191,205 | Rogers | Feb. 20, 1940 |
| 2,258,334 | Miller | Oct. 7, 1941 |
| 2,452,768 | Kuster | Nov. 2, 1948 |
| 2,455,524 | Schultz | Dec. 7, 1948 |
| 2,462,656 | McLendon | Feb. 22, 1949 |
| 2,592,742 | Rose | Apr. 15, 1952 |